UNITED STATES PATENT OFFICE.

JULIUS HERBABNY, OF OFFENBACH-ON-THE-MAIN, GERMANY, ASSIGNOR TO K. OEHLER, ANILIN AND ANILIN FARBEN-FABRIK, OF SAME PLACE.

YELLOW WOOL-DYE AND PROCESS OF MAKING SAME.

SPECIFICATION forming part of Letters Patent No. 627,690, dated June 27, 1899.

Application filed February 20, 1899. Serial No. 706,125. (Specimens.)

*To all whom it may concern:*

Be it known that I, JULIUS HERBABNY, doctor of philosophy, residing at Offenbach-on-the-Main, in the Grand Duchy of Hessen, Empire of Germany, have invented new and useful Improvements in the Manufacture of a New Yellow Dyestuff for Wool, (for which the firm of K. Oehler has applied for Letters Patent in Germany, O. 3,075/22$^a$, of January 25, 1899,) of which the following is a specification.

By the action first of one molecule of para-nitrophenylhydrazin upon oxalo-acetic ether and then of one molecule of diazo-sulfanilic acid upon the thus-obtained pyrazolone a new valuable dyestuff results which dyes woolen goods in very fast yellow tints.

I proceed as follows, parts being by weight: Nine and four-tenths (9.4) parts of oxalo-acetic ether, seven (7) parts of sodium acetate, and nine and one-half (9.5) parts of the hydrochlorate of nitro-phenyl-hydrazin are thoroughly stirred in about one hundred (100) parts of water. Slowly raise the temperature and maintain it at about forty-five to fifty degrees centigrade, (45° to 50° C.) The formation of the condensation product takes place instantaneously. After cooling add twenty-one (21) parts of caustic-soda lye of 35° Baumé. Then stir during three hours at ordinary temperature and about one hour at ninety to one hundred (90° to 100° C.) degrees centigrade. The carboxylic acid of nitro-phenyl-pyrazolone thus formed is precipitated by adding eight (8) parts of concentrated sulfuric acid of 66° Baumé diluted with water to a twenty-per-cent. acid and then filtered off.

In order to form the dyestuff, redissolve the obtained nitro-phenyl-pyrazolone-carboxylic acid in five hundred (500) parts of water containing eighteen and one-half (18.5) parts of sodium carbonate. To the same effect the above-named alkaline solution of the condensation product may also be used. Then at zero degree add the quantity of diazo-sulfanilic acid which results from dissolving 9.7 parts of the sodium salt of sulfanilic acid in one hundred parts of water, subsequently adding 3.6 parts of sodium nitrite and pouring the whole into twenty parts of hydrochloric acid of 20° Baumé diluted with one hundred parts of water. Then stir during twelve (12) hours, heat the mass, precipitate with common salt, filter, press, and dry.

The dyestuff thus obtained forms a light orange-yellow powder easily soluble in water, with a yellow to orange color, which on addition of mineral acids turns slightly to yellow and yellowish green, while caustic-soda lye turns it a little darker.

The new dyestuff compares very favorably with tartrazin. On wool it gives more level shades, is fast to milling, and will stand the action of lime much better.

Now what I claim, and desire to secure by Letters Patent, is the following:

1. The process of making a yellow dyestuff for dyeing wool, consisting in the formation, first of para-nitro-phenyl-pyrazolone-carboxylic acid, by the action of one molecule of para-nitro-phenyl-hydrazin upon one molecule of oxalo-acetic ether, then combining it with one molecule of diazo-sulfanilic acid.

2. As a new article of manufacture, the yellow dyestuff, which derives from para-nitro-phenyl-pyrazolone-carboxylic acid and diazo-sulfanilic acid, and which is characterized by the following properties, it forms a light orange powder, easily soluble in water, slightly soluble in alcohol of ninety per cent. with a yellow color; the aqueous solution, on addition of caustic-soda lye, turns a little darker and becomes rather lighter when adding mineral acids; it dissolves in concentrated sulfuric acid with a yellowish-brown color, which solution on diluting with a little water separates out a yellow flocculent precipitate, which on adding more water redissolves with a yellow color and dyes woolen goods in greenish-yellow tints, which are very fast to milling.

In testimony whereof I have signed my name to this specification in the presence of two subscribing witnesses.

JULIUS HERBABNY.

Witnesses:
DEAN B. MASON,
JEAN GRUND.